United States Patent
Tang et al.

(10) Patent No.: US 9,139,727 B2
(45) Date of Patent: Sep. 22, 2015

(54) LOW DAMPING HIGH STRENGTH POLYMER WITH LONG CHAIN BRANCHING FOR USE IN ANTI-VIBRATION APPLICATIONS

(71) Applicant: LION COPOLYMER GEISMAR, LLC, Geismar, LA (US)

(72) Inventors: Solomon H. K. Tang, Baton Rouge, LA (US); Willie Charles Burton, Baton Rouge, LA (US); Garrett Doucet, Baton Rouge, LA (US)

(73) Assignee: LION COPOLYMER GEISMAR, LLC, Geismar, LA (US)

( * ) Notice: Subject to any disclaimer, the term of this patent is extended or adjusted under 35 U.S.C. 154(b) by 0 days.

(21) Appl. No.: 14/554,760

(22) Filed: Nov. 26, 2014

(65) Prior Publication Data

US 2015/0087766 A1    Mar. 26, 2015

Related U.S. Application Data

(63) Continuation-in-part of application No. 14/049,037, filed on Oct. 8, 2013, now Pat. No. 8,901,236, and a continuation-in-part of application No. 14/049,075, filed on Oct. 8, 2013, now Pat. No. 8,901,238.

(60) Provisional application No. 61/711,596, filed on Oct. 9, 2012.

(51) Int. Cl.
| | |
|---|---|
| *C08L 47/00* | (2006.01) |
| *C08L 23/16* | (2006.01) |
| *C08F 210/06* | (2006.01) |
| *C08F 210/18* | (2006.01) |
| *C08L 23/14* | (2006.01) |
| *C08F 4/68* | (2006.01) |

(52) U.S. Cl.
CPC ............. *C08L 47/00* (2013.01); *C08F 210/06* (2013.01); *C08F 210/18* (2013.01); *C08L 23/145* (2013.01); *Y10S 526/905* (2013.01)

(58) Field of Classification Search
CPC ...... C08L 23/16; C08L 47/00; C08L 2205/02; C08L 2207/322; C08F 210/18
USPC ................................. 524/518, 554; 525/240
See application file for complete search history.

(56) References Cited

U.S. PATENT DOCUMENTS

| | | | |
|---|---|---|---|
| 3,838,137 A | 9/1974 | Tang | |
| 3,856,765 A | 12/1974 | Collette et al. | |
| 3,884,993 A * | 5/1975 | Gros | .............. 525/211 |
| 3,903,062 A | 9/1975 | Arrighetti et al. | |
| 4,156,767 A | 5/1979 | Hall | |
| 5,242,971 A * | 9/1993 | Nakahama et al. | ........... 524/526 |
| 5,473,017 A | 12/1995 | Wang | |
| 5,621,044 A | 4/1997 | Wang | |
| 5,786,504 A | 7/1998 | Nudenberg et al. | |
| 6,300,451 B1 | 10/2001 | Mehta et al. | |
| 6,384,162 B1 | 5/2002 | Zahalka et al. | |
| 6,686,419 B2 * | 2/2004 | Wouters et al. | ............... 525/237 |
| 8,901,236 B2 | 12/2014 | Burton et al. | |
| 8,901,238 B2 | 12/2014 | Tang et al. | |
| 2004/0122190 A1 | 6/2004 | Cady et al. | |
| 2014/0100325 A1 | 4/2014 | Burton et al. | |

FOREIGN PATENT DOCUMENTS

CA        980497 A1    12/1975

OTHER PUBLICATIONS

Skinner et al, Cis-trans isomerism in Ziegler-catalysed terpolymerization of hexa-1,4-diene with ethylene and propylene, Polymer, vol. 13, Issue 5, May 1972, pp. 242-244.

* cited by examiner

*Primary Examiner* — Fred M Teskin
(74) *Attorney, Agent, or Firm* — Buskop Law Group, PC; Wendy Buskop

(57) ABSTRACT

A low damping high strength polymer with a blend of a terpolymer and a tetrapolymer utilizing ethylene, propylene, and non-conjugated dienes. This polymer allows for the creation of products with high diene contents and broad molecular weight distributions while utilizing a continuous flow reactor and a known catalyst. The polymer allows for these products to be made without gelling or fouling of the reactor, which are problems known in the art.

6 Claims, 1 Drawing Sheet

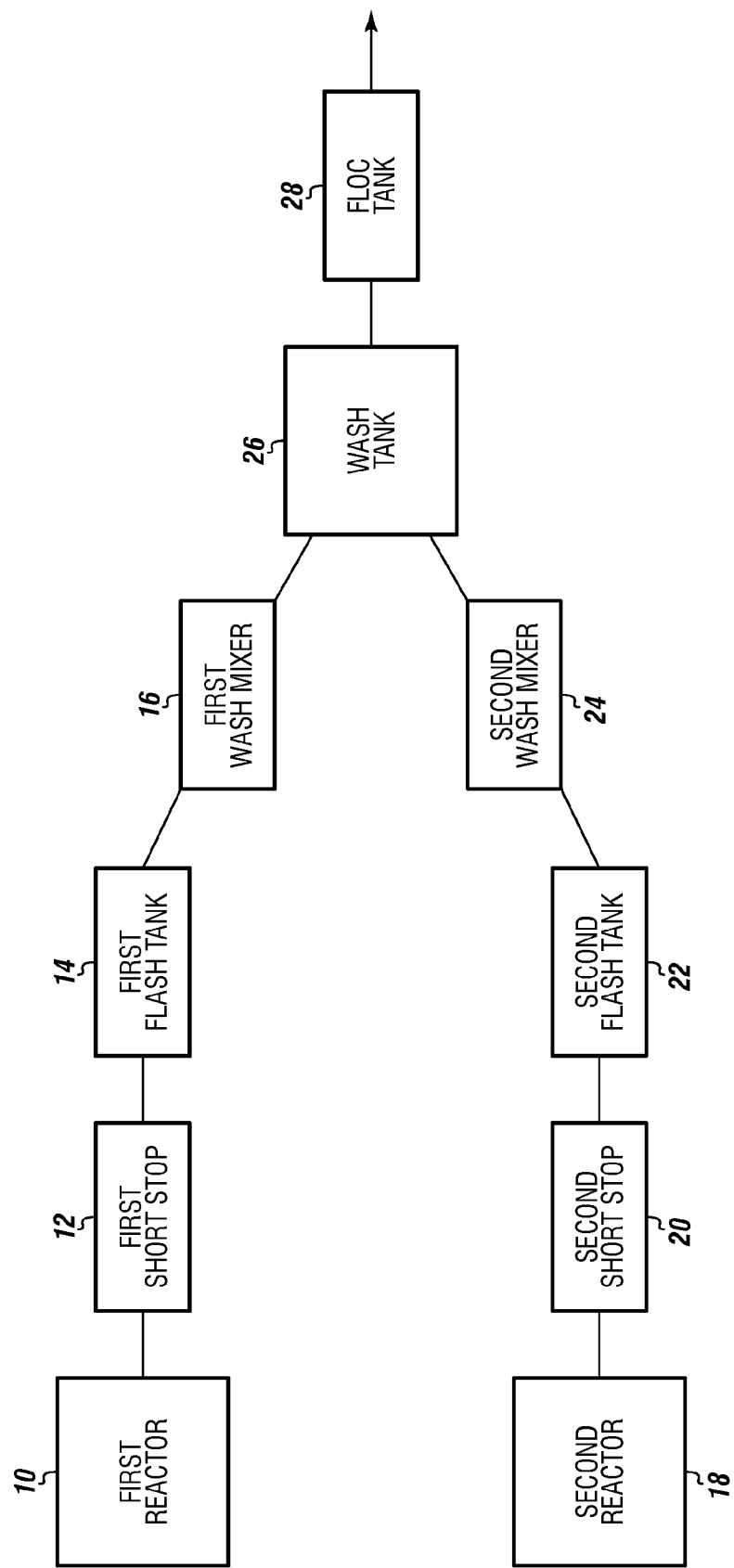

LOW DAMPING HIGH STRENGTH POLYMER WITH LONG CHAIN BRANCHING FOR USE IN ANTI-VIBRATION APPLICATIONS

CROSS REFERENCE TO RELATED APPLICATIONS

The present application is a Continuation in Part of co-pending U.S. patent application Ser. No. 14/049,037 filed on Oct. 8, 2013, entitled "PROCESS FOR CREATING AN ETHYLENE ELASTOMER," issued as U.S. Pat. No. 8,901,236 on Dec. 2, 2014 and is a Continuation in Part of co-pending U.S. patent application Ser. No.: 14/049,075 filed on Oct. 8, 2013, entitled "SPONGE POLYMER WITH CONTROLLED LONG CHAIN BRANCHING AND BROAD MOLECULAR WEIGHT DISTRIBUTION," issued as U.S. Pat. No. 8,901,238 on Dec. 2, 2014, both of these applications claim priority to and the benefit of U.S. Provisional Patent Application Ser. No.: 61/711,596 filed on Oct. 9, 2012, entitled "METHOD FOR MAKING A SPONGE POLYMER." These references are hereby incorporated in their entirety.

FIELD

The present embodiments generally relate to a long chain ethylene elastomer polymer having (i) an ethylene propylene diene tetrapolymer and (ii) either: an ultrahigh molecular weight ethylene propylene diene terpolymer or an ultrahigh molecular weight ethylene propylene diene tetrapolymer for use in anti-vibration applications.

BACKGROUND

A need exists for a low damping high strength polymer with both high density impact absorbance and high heat resistance.

A need exists for a low damping high strength polymer for use as motor mounts.

A need exists for a low damping high strength polymer with a significant degree of long chain branching, a high degree of diene content, a unique molecular weight distribution, and favorable elasticity characteristics.

The present embodiments meet these needs.

BRIEF DESCRIPTION OF THE DRAWINGS

The figure is a diagram of the process for blending polymers according to one or more embodiments.

FIG. 1 is a diagram of the process for the blending polymers according to one or more embodiments.

The present embodiments are detailed below with reference to the listed Figure.

DETAILED DESCRIPTION OF THE EMBODIMENTS

Before explaining the present polymer in detail, it is to be understood that the polymer is not limited to the particular embodiments and that it can be practiced or carried out in various ways.

The present embodiments relate to a polymer formed from EPDM tetrapolymer boasting surprising physical and chemical characteristics as well as excellent processability.

The EPDM tetrapolymer is an ethylene propylene diene tetrapolymer with two or more conjugated dienes that exhibits exceptional smoothness when extruded, and is suitable for use in multiple applications such as sealing and noise dampening. The tetrapolymer further exhibits excellent non-linear viscosity characteristics and compression set characteristics.

A benefit of the ethylene elastomer is that the chemical components are easy to process and allow for a continuous flow process which can be operated 24 hours a day, 7 days a week, making a bright polymer with high purity.

In one or more embodiments, the polymer can include an extender oil.

A benefit of the polymer is that the resulting ethylene elastomer can be reduced easily into friable bales for easy transport and delivery to a user of the polymer.

A benefit of this ethylene elastomer formed by this process is that the material is easy to use in a mixer, breaking down for easy blending with other compounding ingredients.

The polymer created herein contains high diene content without reactor fouling due to gelling (or uncontrolled branching reactions).

The ethylene elastomer has high degrees of long chain branching, a high molecular weight, a broad molecular weight distribution (MWD), a low tangent delta, and a high diene content while making use of a known catalyst and a single reactor.

As used within this application, the term "diene" can refer to an organic compound containing two double bonds. Further, usable dienes are those that are capable of being polymerized by a Ziegler-Natta catalyst.

As used within this application, the term "molecular weight distribution" or (MWD) can refer to the weight average molecular weight of a polymer (Mw) divided by the number average molecular weight of a polymer (Mn). Mw and Mn are determined as follows:

$$M_n = \frac{\sum_i N_i M_i}{\sum_i N_i}$$

and $$M_w = \frac{\sum_i N_i M_i^2}{\sum_i N_i M_i}$$

Wherein, $N_i$ is the number of molecules having molecular weight $M_i$ in a given polymer sample.

As used within this application, the term "tangent delta" is a measure of the relationship between viscosity and elasticity that is known to those ordinarily skilled in the art.

The descriptions below make use of norbornene derivatives as the diene for exemplary reasons. In particular, vinyl norbornene is usable herein. However, other dienes with similar chemical and reactive characteristics may be substituted by persons ordinarily skilled in the art.

In this process, a 5-Ethylidene-2-norbornene (ENB) can be used. In embodiments it can comprise the structure:

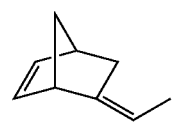

Molecular Structure:
Formula: C9H12
Molecular Weight: 120.19
Synonyms for this molecule can include: ENB; Ethylidene Norbornene; 5-Ethylene-2-Norborene; Ethylidene-2-Norbornene; 5-Ethylidene Norbornene; 5-Ethylidene-2-Norbornen; 5-Ethylidenenorborn-2-ene; 5-ethylidene-5-norbornene; Ethylidene Norbornene (ENB)
  Boiling Point: 146 degrees Celsius at 760 mmHg
  Flash Point: 38.3 degrees Celsius
In this process, a 5-vinyl-2-norbornene (VNB) can be used which is known by the structure:

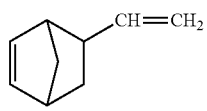

Molecular Structure:
Formula: C9H12
Molecular Weight: 120.21
Synonyms for this molecule can include: 2-Norbornene,5-vinyl-(6CI,7CI,8CI); 2-Vinyl-5-norbornene; 2-Vinylbicyclo[2.2.1]hept-5-ene; 2-Vinylnorbornene; 5-Ethenylbicyclo[2.2.1]hept-2-ene; 5-Vinyl-2-norbornene; 5-Vinylbicyclo[2.2.1]hept-2-ene; 5-Vinylnorbornene; NSC 61529; V 0062; VBH; Vinylnorbornene
  Boiling Point: 141 degrees Celsius at 760 mmHg
  Flash Point: 28 degrees Celsius
VNB is a non-conjugated diene with which it is known to be difficult to create copolymers due to its propensity to branch uncontrollably, create gels during polymerization, and foul a reactor.

The unique process allows for relatively large concentrations of VNB in tetrapolymers, and uniquely allows for terpolymers with a VNB component to be created.

In embodiments, a thermoplastic vulcanizate comprising the tertrapolymer and the terpolymer blend can be made using the process for continuously making a blend of a terpolymer with a tetrapolymers, comprising ethylene monomers, alpha olefin monomers, and at least two non-conjugated diene monomers.

The general process for making the polymer is described as follows:

A saturated hydrocarbon solvent is utilized as a reaction medium and carrier stream for all monomers used in the process. The saturated hydrocarbon is introduced to the reactor at a flow rate adequate to sustain a residence time of 30 minutes to 60 minutes in the reactor. Prior to entering the reactor, the saturated hydrocarbon stream is passed through a chiller to reduce its temperature below 35 degrees Celsius.

In the examples shown below, hexane can be used as the hydrocarbon solvent due to its ready availability and ease of removal from the final product. However, many other hydrocarbon solvents can be utilized, such as butane, pentane, heptane, octane, and combinations thereof. Cyclohexane can be used.

A pure ethylene monomer is introduced to the saturated hydrocarbon solvent at a flow rate to achieve the desired ethylene weight content in a final product. The ethylene content in the final product can range from 40 percent to 80 percent by weight. The ethylene to alpha olefin ratio can range from 40:60 to 80:20 in the final product of the tetrapolymer.

A pure propylene monomer is introduced to the saturated hydrocarbon solvent at a flow rate to achieve the desired propylene weight content in a final product. The propylene content in the final product can range from 60 percent to 20 percent, and be in a range of 33 percent to 37 percent by weight.

The example shown below utilizes a norbornene derivative as the diene. However, similar results are to be expected with other dienes with similar chemical characteristics.

Utilizing ethylene, propylene and a diene results in an ethylene propylene diene monomer (EPDM) in the example below. EPDM is a well-known product class with desirable properties.

Hydrogen is introduced to the saturated hydrocarbon solvent at a flow rate adequate to achieve a desired molecular weight in the final product.

The dienes are introduced to the saturated hydrocarbon solvent/carrier at a rate sufficient to achieve the desired weight percent in the final polymer.

The dienes can be numerous compounds as known to persons ordinarily skilled in the art. In the current example, both 5-ethylidene-2-norbornene (ENB) and 5-Vinyl-2-norbornene (VNB) are used as dienes for preparing a final product.

Some examples of other norbornene derivatives are: 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, 5-(7-octenyl)-2-norbornene.

The mixture of the saturated hydrocarbon solvent, propylene, hydrogen, and dienes is sent through a chiller to reduce its temperature below 35 degrees Celsius. As the polymerization reaction to follow is exothermic, this cooling step helps to maintain the desired temperature range within the reactor. Although the process as described is for solution polymerization, with some minor adjustments to catalyst, it can be adapted to gas, or slurry phase processes.

A Ziegler-Natta catalyst, optionally a catalyst promoter, and co-catalyst, are introduced to the reactor concurrently with the cooled mixture of the saturated hydrocarbon solvent, alpha olefin, hydrogen, and dienes and optionally, a promoter can be introduced into the continuous flow reactor.

The Ziegler-Natta catalyst comprises a transition metal or a transition metal compound. Some examples of transition metals or compounds thereof for the current invention are Vanadium, Titanium, and Zirconium. However, other transition metals can be substituted by persons ordinarily skilled in the art.

The Ziegler-Natta catalyst is introduced at a flow rate sufficient to sustain a continuous reaction. The example below serves to illustrate this.

The co-catalyst comprises a metal alkyl which further comprises a halogen element. The co-catalysts utilized can be Diethylaluminum chloride, Ethylaluminum sesquichloride, or Ethylaluminum dichloride.

However, many other compounds can be substituted by persons ordinarily skilled in the art.

The co-catalyst is introduced at a flow rate sufficient to sustain a continuous reaction. The example below serves to illustrate this.

The promoter if used, can be an oxidizing agent capable of oxidizing the transition metal and generating at least one halogen free radical per mole of promoter used. An example of a promoter is a chlorinated ester, such as Butyl-2methyl, 4,4,4-trichlorobut-2-enoate. However, many other organic compounds that generate halogen free radicals can be substituted by persons ordinarily skilled in the art.

The promoter is introduced either separately, or in solution with the Ziegler-Natta catalyst at a flow rate sufficient to sustain a continuous reaction. The example below serves to illustrate this.

The flow rate of all the above components is adjusted to allow for a residence time from 30 minutes to 60 minutes in the reactor at a temperature from 35 degrees Celsius to 65 degrees Celsius and at a pressure of 190 pounds per square inch gauge (psig) to 230 pounds per square inch gauge (psig).

The first of two polymers used to create the unique low damping high strength polymer, the tetrapolymer component is made by this process. The result has a broad breadth molecular weight distribution, and a broad range of desirable characteristics that can be customized to the desired application, such as 3.0 to 10.00 Mw/Mn. In embodiments, the low damping high strength polymer can be further adapted to be: extruded, molded calandered, and/or combinatons thereof.

This process creates broad breadth molecular weight distribution (MWD) products, which translates to higher green strengths, improved mill handling, extremely smooth extrusion surfaces due to the relationship between viscosity and shear rate, and optimum qualities for injection molding.

At the same time, this polymer has for high diene content which translates to faster cure rates, and excellent compression set characteristics for sealing applications. Specifically, this product allows for a large VNB concentration.

This tetrapolymer can be created without fouling of the reactor due to gelling, or uncontrolled branching, while utilizing only one reactor and high quantities of dienes. Specifically, high quantities of VNB can be utilized without fouling of the reactor.

The combination of broad breadth molecular weight distribution, low tangent delta, and high diene content is known in the art to be difficult to accomplish in a single reactor system without fouling of the reactor.

An embodiment of the tetrapolymer EPDM is described below:

EXAMPLE 1

In this example a tetrapolymer having high molecular weight (Mw), broad breadth molecular weight distribution (MWD), high degree of branching and high diene content is produced. The reactor is charged with hexane at a flow rate of 107 grams per minute at temperature of 45 degrees Celsius and a reactor pressure of 200 psig.

Next, pure propylene monomer is introduced to the hexane stream at a flow rate of 19 grams per minute.

As the next step, a hydrogen in nitrogen mix with 10 percent hydrogen by weight is introduced to the hexane stream at a flow rate of 5.8 standard liters per hour.

Next, an ethylidene norbornene (ENB) monomer solution (in hexane) is introduced to the hexane stream at a flow rate of 76 grams of solution per hour.

As the next step, a 5-vinyl-2-norbornene monomer solution (in hexane) is introduced to the hexane stream at a flow rate of 98 grams per hour.

Next, a chlorinated aluminum alkyl co-catalyst solution (ethyl aluminum sesquichloride in hexane) is fed directly to the reactor by separate stream at a rate of 78 grams of solution per hour.

Subsequently, a Ziegler-Natta catalyst solution (vanadium oxytrichloride in hexane) and a promoter solution (in hexane) are introduced to the reactor by separate stream at flow rates of 72 grams per hour each.

The Ziegler-Natta catalyst and promoter are premixed in hexane to yield a solution that is fed directly to the reactor as a single stream.

In the next step, a polymer grade ethylene monomer is incrementally introduced to the hexane stream to reach a maximum flow rate of 6.6 grams per minute.

When all reagents have been added to the reactor, the polymerization reaction is allowed to proceed with a residence time of approximately 30 minutes at a temperature of 45 degrees Celsius and a reactor pressure of 200 psig, resulting in a tetrapolymer.

The tetrapolymer as formed has a weight average molecular weight of 500,000 to 2,500,000, a broad breadth molecular weight distribution (MWD) of 3.0 to 10, in this embodiment 3.16, a Mooney viscosity (ML 1+4@ 125 degrees Celsius) of 50 to (ML 1+4@ 150 degrees Celsius) 215, in this example 82 Moony Units (MU), and a very low tangent delta value of from 0.15 to 0.75, in this example 0.60, indicative of a high level of branching.

The polymer chain branching can be seen from the tangent delta ranging from 0.15 to 0.75.

In this specific example, the tetrapolymer has an ethylene:propylene ratio of 62:38, a VNB weight percent of 0.33 weight percent and ENB content of 7.3 weight percent.

In this example, a resultant tetrapolymer can be formed with the following characteristics: polymer chain branching as characterized by a tangent delta ranging from 0.15 to 0.75; a non-linear relationship between viscosity and shear as characterized by the tangent delta from 0.15 to 0.75; a weight average molecular weight of a weight average molecular weight of 550,000 to 2,500,000; a Mooney viscosity ranging from (ML 1+4@ 125 degrees Celsius) 50 to (ML 1+4@ 150 degrees Celsius) 215; an ethylene to alpha olefin ratio ranging from 40:60 to 80:20; a molecular weight distribution ranging from 3.0 to 10; and a combined weight content of ethylene and alpha olefin of 50 percent to 80 percent based upon the total weight of the VNB EPDM tetrapolymer; a first non-conjugated diene content of 0.01 percent to 25 percent by weight content based upon the total weight of the VNB EPDM tetrapolymer; and a second non-conjugated diene content if used of 0.01 percent to 5 percent by weight content based upon the total weight of the VNB EPDM tetrapolymer.

Once the tetrapolymer is created, in a second reactor either: an ultrahigh molecular weight ethylene propylene diene terpolymer or an ultrahigh molecular weight ethylene propylene diene tetrapolymer is created.

The following table provides examples of formed tetrapolymers and their physical properties. Each of these tetrapolymers was made using the same process as Example 1.

|         | Ex. 2   | Ex. 3  | Ex. 4   | Ex. 5  | Ex. 6  | Ex.7   |
|---------|---------|--------|---------|--------|--------|--------|
| % C3    | 21.9    | 35.2   | 30.6    | 40.2   | 40.7   | 38     |
| % ENB   | 13.6    | 4.6    | 4.7     | 4.5    | 4.4    | 9.5    |
| % VNB   | 1.7     | 2.2    | 2.2     | 2.2    | 2.3    | 0.3    |
| Mn [Da] | 257382  | 138229 | 150470  | 121465 | 196034 | 181000 |
| Mw [Da] | 1610000 | 898049 | 1420000 | 683274 | 869124 | 558000 |

-continued

|  | Ex. 2 | Ex. 3 | Ex. 4 | Ex. 5 | Ex. 6 | Ex.7 |
|---|---|---|---|---|---|---|
| Mz [Da] | 12270000 | 7879000 | 13920000 | 3355000 | 3308000 | 1934000 |
| Mw/Mn | 6.25 | 6.50 | 9.44 | 5.63 | 4.43 | 3.09 |

From 0.1 to 0.5 weight percent of an antioxidant based on the total weight percent of the final tetrapolymer is added to the tetrapolymer after it is created.

UltraHigh Molecular Weight Ethylene Propylene Diene Terpolymer

A liquid phase ultrahigh molecular weight ENB EPDM terpolymer is made using ethylene monomers, propylene monomers, and optionally a third non-conjugated diene monomer can be continuously formed by first introducing a saturated hydrocarbon stream.

The liquid phase ultrahigh molecular weight ENB EPDM terpolymer has the following characteristics: polymer chain branching as characterized by a tangent delta ranging from 1.0 to 0.75; a non-linear relationship between viscosity and shear as characterized by the tangent delta from 1.0 to 0.75; a weight average molecular weight of 700,000 to 2,500,000, Daltons, a Mooney viscosity ranging from (ML 1+4@ 150 degrees Celsius) 80 to (ML 1+4@ 150 degrees Celsius) 215; an ethylene to alpha olefin ratio ranging from 65:35 to 75:25; a molecular weight distribution ranging from 2.0 to 2.5; a combined weight content of ethylene and alpha olefin of 93 percent to 97 percent based upon the total weight of the ENB EPDM terpolymer; and a first non-conjugated diene content of 3 percent to 7 percent by weight content based upon the total weight of the ENB EPDM terpolymer.

The third non-conjugated diene can be a dicyclopentadiene.

Molecular Structure of Third Diene:
Formula: C10H12
Molecular Weight: 132.2
A synonym for dicyclopentadiene is 1,3-Dicyclopentadiene
  Boiling Point: 170 degrees Celsius
  Flash Point: 32 degrees Celsius
  Melting Point: 32.5 degrees Celsius
  Density: 0.98 g/mL at 25 degrees Celsius To form this liquid phase ultrahigh molecular weight ENB EPDM terpolymer a propylene monomer is introduced to a saturated hydrocarbon stream at a rate sufficient to achieve propylene content in the final liquid phase ultrahigh molecular weight ENB EPDM terpolymer of 25 percent to 35 percent of total weight.

The next step involves introducing hydrogen gas to the saturated hydrocarbon stream at a rate sufficient to control the molecular weight of the final liquid phase ultrahigh molecular weight ENB EPDM terpolymer.

The next step involves introducing a third diene to the saturated hydrocarbon stream at a rate sufficient to achieve the desired third diene content in the final liquid phase ultrahigh molecular weight ENB EPDM terpolymer.

The next step involves introducing an ethylene monomer to the saturated hydrocarbon stream at a rate sufficient to initiate the polymerization reaction and achieve the desired ethylene content in a final liquid phase ultrahigh molecular weight ENB EPDM terpolymer of 60 percent to 75 percent of total weight.

The next step involves cooling the saturated hydrocarbon stream, the propylene monomer, the hydrogen gas, the third diene, and the ethylene monomer to below 35 degrees Celsius to create a cooled mixture while concurrently introducing a Ziegler-Natta catalyst, a co-catalyst, and optionally a promoter into a continuous flow reactor, wherein the Ziegler-Natta catalyst comprises a transition metal or a transition metal compound; the co-catalyst comprises a metal alkyl comprising a halogen element; and the promoter if used, comprises an oxidizing agent capable of oxidizing the transition metal, and the oxidizing agent is capable of generating at least one halogen free-radical per mole of the promoter.

The next step involves reacting the cooled mixture, the Ziegler-Natta catalyst, the co-catalyst, the promoter if used, the first diene, in solution phase for 30 minutes to 60 minutes at a temperature from 35 degrees Celsius to 65 degrees Celsius and a pressure from 190 psig to 230 psig; and forming an ultrahigh molecular weight ENB EPDM terpolymer.

The final step involves continuously blending the VNB EPDM tetrapolymer with the ultrahigh molecular weight ENB EPDM terpolymer forming a low damping high strength polymer with high density impact absorbency and heat resistance.

In embodiments, the process for continuously making a blend of a terpolymer with a tetrapolymers can use 75 to 45 weight percent liquid phase VNB EPDM (such as ROYALENE® 636 made by Lion Copolymer Geismar, LLC of Louisiana), and 3 weight percent to 5 weight percent of a first solvent such as isopar, 25 weight percent to 55 weight percent liquid phase ultrahigh molecular weight ENB EPDM terpolymer; and 3 weight percent to 5 weight percent of a second solvent, such as toluene, based on the total weight of the formed low damping high strength polymer.

The process for making the terpolymer can include using 0.1 to 0.5 weight percent of an antioxidant based on the total weight percent of the terpolymer.

The physical properties of the VNB EPDM are in the chart below.

In the table below is an exemplary liquid phase ultrahigh molecular weight ENB EPDM terpolymer made according to this process including the physical properties of this terpolymer.

|  | Ex. 8 |
|---|---|
| % C3 | 30 |
| % ENB | 4.5 |
| % VNB | 0 |
| Mn [Da] | 406156 |
| Mw [Da] | 857036 |
| Mz [Da] | 1684181 |
| Mw/Mn | 2.21 |

In the table below are examples of the formed low damping high strength polymer prepared according to this described process including the physical properties.

|          | Ex. 9   | Ex. 10  | Ex. 11  | Ex. 12  | Ex. 13  | Ex. 14  |
|----------|---------|---------|---------|---------|---------|---------|
| % C3     | 25.1    | 33.1    | 30.4    | 36.1    | 36.4    | 34.8    |
| % ENB    | 10.0    | 4.6     | 4.6     | 4.5     | 4.4     | 7.5     |
| % VNB    | 1.0     | 1.3     | 1.3     | 1.3     | 1.4     | 0.2     |
| Mn       | 316892  | 245400  | 252745  | 235342  | 280083  | 271063  |
| Mw       | 1308814 | 881644  | 1194814 | 752779  | 864289  | 677614  |
| Mz       | 8035672 | 5401072 | 9025672 | 2686672 | 2658472 | 1834072 |
| Mw/Mn    | 4.13    | 3.59    | 4.73    | 3.20    | 3.09    | 2.50    |
| Oil, PHR | 20      | 20      | 20      | 20      | 20      | 29      |

Turning now to the Figure, the Figure depicts an exemplary flow diagram of the process for blending polymers according to one or more embodiments The first reactor 10 is used to create the VNB-based EPDM tetrapolymer.

In the first reactor 10, the ingredients described above are added in the sequence already described.

The first reactor 10 product is then flowed to a first short stop tank 12 to stop the reaction.

From the first short stop tank 12, the reactor product is flowed to a first flash tank 14 that removes unreacted monomer.

The reaction product from the first reactor 10 is then flowed from the first flash tank 14 to a first wash mixer 16 and agitated.

The agitated mixture is flowed from the first wash mixer 16 to a wash tank 26.

The terpolymer is created in the second reactor 18 which contains the ingredients to create ENB-based EPDM terpolymer.

In the second reactor 18, the ingredients described above are added in the sequence already described and then flowed to a second short stop tank 20 to stop the reaction.

From the second short stop tank 20, the reactor product is flowed to a second flash tank 22.

The second flash tank 22 removes unreacted monomers. Material from the second flash tank is then blended with a fluid in a second wash mixer 24.

The mixture from the second wash mixer 24 is then transferred to the wash tank 26 already containing the material from the first reactor 10.

In the wash tank 26, water is used to remove unwanted polymer from the two blended materials of tetrapolymer and terpolymer.

The washed blend of tetrapolymer and terpolymer is then passed to a flocculent tank 28. In the flocculent tank 28, a flocculent is introduced to the solids from the wash tank. In embodiments, the flocculent can be steam and water, to remove solvent from the blended solids. The blended solids are then compounded into a material used to create anti-vibration high temperature resistant motor mounts.

While these embodiments have been described with emphasis on the embodiments, it should be understood that within the scope of the appended claims, the embodiments might be practiced other than as specifically described herein.

What is claimed is:

1. A low damping high strength ethylene propylene diene polymer comprising:
   a. a tetrapolymer with the following characteristics:
      (i) polymer chain branching as characterized by a tangent delta ranging from 0.15 to 0.75;
      (ii) a non-linear relationship between viscosity and shear as characterized by the tangent delta from 0.15 to 0.75;
      (iii) a weight average molecular weight from 500,000 to 2,500,000 Daltons;
      (iv) a Mooney viscosity ranging from (ML 1+4@ 125 degrees Celsius) 50 to (ML 1+4@ 150 degrees Celsius) 215;
      (v) an ethylene to a propylene ratio ranging from 40:60 to 80:20 by weight;
      (vi) a molecular weight distribution ranging from 3.0 to 10;
      (vii) a combined weight content of ethylene and the propylene of 50 percent to 80 percent based upon the total weight of the tetrapolymer;
      (viii) a first non-conjugated diene content of 0.01 percent to 25 percent by weight content based upon the total weight of the tetrapolymer; and
      (ix) a second non-conjugated diene of 0.01 percent to 5 percent by weight content based upon the total weight of the tetrapolymer;
   b. a liquid phase ultrahigh molecular weight ENB EPDM terpolymer with the following characteristics:
      (i) polymer chain branching as characterized by a tangent delta ranging from 1.0 to 0.75;
      (ii) a non-linear relationship between viscosity and shear as characterized by the tangent delta from 1.0 to 0.75;
      (iii) a weight average molecular weight from 700,000 to 2,500,000 Daltons;
      (iv) a Mooney viscosity ranging from (ML 1+4@ 150 degrees Celsius) 80 to (ML 1+4@ 150 degrees Celsius) 215;
      (v) an ethylene to propylene ratio ranging from 65:35 to 75:25 by weight;
      (vi) a molecular weight distribution ranging from 2.0 to 2.5;
      (vii) a combined weight content of ethylene and the propylene of 93 percent to 97 percent based upon the total weight of the ENB EPDM terpolymer; and
      (viii) a first non-conjugated diene content of 3 percent to 7 percent by weight content based upon the total weight of the ENB EPDM terpolymer; and
   wherein the tetrapolymer is continuously blended with the ultrahigh molecular weight ENB EPDM terpolymer forming the low damping high strength ethylene propylene diene polymer.

2. The low damping high strength ethylene propylene diene polymer of claim 1, comprising:
   a. 75 to 45 weight percent of the liquid phase tetrapolymer;
   b. 3 weight percent to 5 weight percent of a first solvent;
   c. 25 weight percent to 55 weight percent the liquid phase ultrahigh molecular weight ENB EPDM terpolymer; and d. 3 weight percent to 5 weight percent of a second solvent based on the total weight of the formed low damping high strength ethylene propylene diene polymer.

3. The low damping high strength ethylene propylene diene polymer of claim 1, comprising: 0.1 to 0.5 weight percent of an antioxidant added to low damping high strength ethylene propylene diene polymer.

4. The low damping high strength ethylene propylene diene polymer of claim 1, wherein the first non-conjugated diene and the second non-conjugated diene are both norbornene derivatives.

5. The low damping high strength ethylene propylene diene polymer of claim 4, wherein the second non-conjugated diene is a vinyl norbornene.

6. The low damping high strength ethylene propylene diene polymer of claim 1, further comprising an extender oil.

\* \* \* \* \*